(12) United States Patent
Numoto (10) Patent No.: US 8,290,345 B2
(45) Date of Patent: Oct. 16, 2012

(54) DIGEST GENERATION FOR TELEVISION BROADCAST PROGRAM

(75) Inventor: Tatsuhiko Numoto, Osaka (JP)

(73) Assignee: Panasonic Corporation, Osaka (JP)

( * ) Notice: Subject to any disclaimer, the term of this patent is extended or adjusted under 35 U.S.C. 154(b) by 1213 days.

(21) Appl. No.: 12/106,397

(22) Filed: Apr. 21, 2008

(65) Prior Publication Data

US 2008/0303943 A1   Dec. 11, 2008

(30) Foreign Application Priority Data

Jun. 5, 2007   (JP) ................. 2007-149703

(51) Int. Cl.
*G11B 27/00* (2006.01)
*H04N 5/93* (2006.01)
*H04N 9/80* (2006.01)
*H04N 5/92* (2006.01)

(52) U.S. Cl. ........ 386/278; 386/239; 386/244; 386/245; 386/248; 386/280; 386/281; 386/326

(58) Field of Classification Search ............... 386/239, 386/244, 245, 248, 278, 280, 281, 326
See application file for complete search history.

(56) References Cited

U.S. PATENT DOCUMENTS

| | | | |
|---|---|---|---|
| 5,974,218 A | 10/1999 | Nagasaka et al. | |
| 6,532,590 B1 * | 3/2003 | Chimoto | 725/43 |
| 2002/0051081 A1 | 5/2002 | Hori et al. | |
| 2003/0187919 A1 | 10/2003 | Nakamura et al. | |
| 2005/0232588 A1 | 10/2005 | Hosoda et al. | |
| 2008/0292279 A1 * | 11/2008 | Kamada et al. | 386/124 |
| 2009/0100454 A1 * | 4/2009 | Weber | 725/9 |

FOREIGN PATENT DOCUMENTS

| | | |
|---|---|---|
| JP | 2000-023062 | 1/2000 |
| JP | 2002-262228 | 9/2002 |
| JP | 2002-344871 | 11/2002 |
| JP | 2005-18925 | 1/2005 |
| JP | 3640615 | 1/2005 |
| JP | 2005-348077 | 12/2005 |

* cited by examiner

*Primary Examiner* — Daquan Zhao
(74) *Attorney, Agent, or Firm* — McDermott Will & Emery LLP (57) ABSTRACT

In a device for generating a digest of a television broadcast program containing subtitle information, a character number calculation section calculates, based on the subtitle information, a character number of a subtitle displayed in each of segments provided at regular intervals. A digest scene specifying section compares the calculated character number with a threshold and specifies, as one or more digest scenes of the television broadcast program, one or more segments in which the calculated character number is larger than the threshold.

21 Claims, 5 Drawing Sheets

DIGEST GENERATION FOR TELEVISION BROADCAST PROGRAM

CROSS-REFERENCE TO RELATED APPLICATION

This application claims priority under 35 U.S.C. §119(a) on Japanese Patent Application No. 2007-149703 filed on Jun. 5, 2007, the entire contents of which are hereby incorporated by reference.

BACKGROUND OF THE INVENTION

1. Field of the Invention

The present invention relates to recording and playback of a television broadcast program, and more particularly relates to a technique for generating a digest of a television broadcast program.

2. Description of the Related Art

Some of hard disk recorders for recoding and playing back a television broadcast program have the function of playing back a digest of the program. In such systems, digest scenes are extracted and played back according to a genre designated by a user. Genres for which digests are generated include music programs, sports programs such as baseball, soccer, golf, etc., and the like. For example, in the case of a baseball game, scenes of homeruns and strikeouts are scenes which an audience wants to watch as a digest and, in the case of a soccer game, scenes of plays leading to a goal are such scenes.

In a known technique, scenes where a video image is largely changed and an audio level is larger than a predetermined value are detected as digest scenes (see, for example, Japanese Laid-Open Publication No. 2005-348077).

SUMMARY OF THE INVENTION

In the genres of programs such as drama, movies and the like, having a story plot, scenes where a person utters are more important in comprehending an overview of a program than scenes where a video image is largely changed or an audio level is increased. Therefore, if a digest is generated in a known manner for a program in which conversations of persons are dominant in the contents of the program, the generated digest might be one with which a story plot of the program is difficult to comprehend.

In view of the above-described points, it is an object of the present invention to achieve the generation of a digest of a television broadcast program of drama, movie or like genre, which allows easy comprehension of a story plot of the program.

To achieve the above-described object, means devised according to the present invention includes, as a device for generating a digest of a television broadcast program containing subtitle information, a character number calculation section for calculating, based on the subtitle information, a character number of a subtitle displayed in each of segments provided at regular intervals; and a digest scene specifying section for comparing the calculated character number with a threshold and specifying, as one or more digest scenes of the television broadcast program, one or more segments in which the calculated character number is larger than the threshold. Moreover, as a method for generating a digest of a television broadcast program containing subtitle information, means devised according to the present invention includes: a first step of calculating, based on the subtitle information, a character number of a subtitle displayed in each of segments provided at regular intervals; and a second step of comparing the calculated character number with a threshold and specifying, as one or more digest scenes of the television broadcast program, one or more of the segments in which the calculated character number is larger than the threshold.

Thus, as one or more digest scenes of a television broadcast program, one or more of segments of the television broadcast program in which the number of characters to be displayed is larger than a threshold is specified. That is, scenes containing utterance of one or more persons are extracted from the entire program and a digest of the extracted scenes is generated.

It is preferable that the character number calculation section and the digest scene specifying section calculates the character number in parallel to recording the television broadcast program and records information for the one or more specified segments in parallel to recording the television broadcast program. In the first and second steps, the same operation as the operation described above is performed. Thus, a digest can be immediately played back after recording a television broadcast program.

It is also preferable that the character number calculation section identifies speakers based on the subtitle information and calculates the character number of each of the identified speakers. Specifically, the character number calculation section obtains information for a character color of the subtitle or character information attached to the subtitle from the subtitle information and identifies speakers using the information for the character color or the character information. Then, for each of the identified speakers, the digest scene specifying section compares the calculated character number with a threshold of an associated one of the speakers and specifies, as one or more digest scenes of the television broadcast program, one or more segments in which a calculated character number of any one of the identified speakers is larger than the threshold of said any one of the speakers. In the first and second steps, the same operation as the operation described above is performed. Thus, a digest in which each of persons is weighted has been performed can be generated.

It is also preferable that the above-described digest generation device further includes a threshold setting section for summing up respective times of the one or more segments specified by the digest scene specifying section, comparing a sum of the times with a designated time and changing the threshold according to a comparison result. The digest scene specifying section respecifies the one or more segments when the threshold is changed. Thus, a digest which can fit in a designated time period can be generated.

It is also preferable that the digest scene specifying section compares the calculated character number with each of a plurality of thresholds and specifying, for each of the thresholds, one or more segments in which the calculated number is larger than an associated one of the thresholds. Then, the device further includes a digest selection section for summing up, for each of the thresholds, respective times of the one or more segments specified by the digest scene specifying section, comparing a sum of the times of each group of the segments specified for an associated one of the thresholds with a designated time and selecting, as the digest of the television broadcast program, one of the groups of the specified segments in which the sum of the times is equal to or smaller than the designated time. In the digest generation method, the same structure as the above-described structure is also used. Thus, a digest which satisfies designated time conditions can be generated in a single processing without repeating the processing of digest scene specification by changing the threshold many times.

It is also preferable that the character number calculation section reads ahead the subtitle information and calculates the character number while the television broadcast program is read out from memory means. In the first step, the same operation as the operation described above is performed. Thus, a result of specification of digest scenes of the broadcast program is not needed to be stored and therefore the size of the buffer for temporarily storing one or more specified segments as one or more digest scenes can be small.

BEST MODE FOR CARRYING OUT THE INVENTION

Hereafter, best modes of the present invention will be described with reference to the accompanying drawings.

First Embodiment

Figure 1:
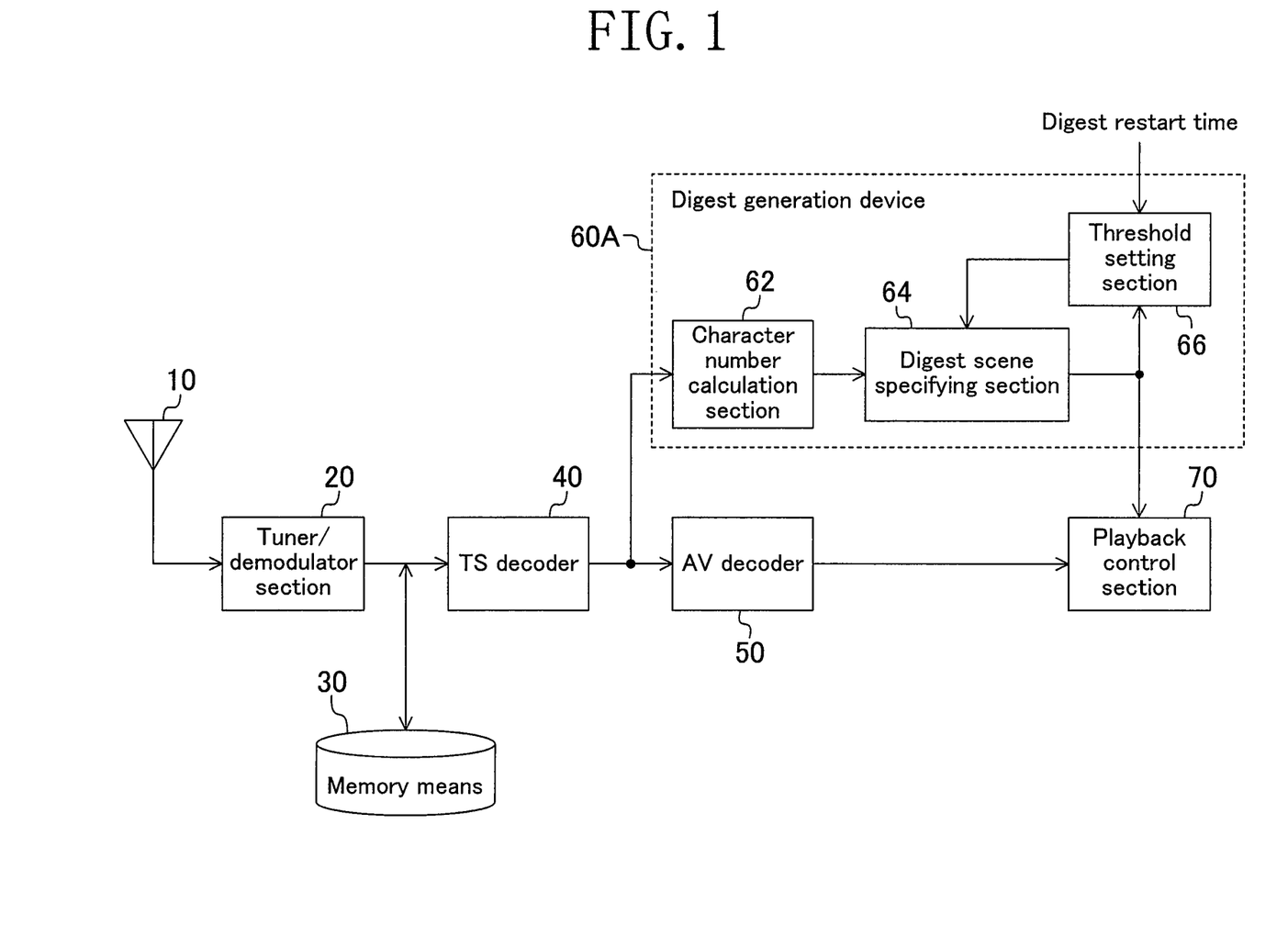
FIG. 1 is a block diagram illustrating a configuration of a television broadcast program recording/playback system according to a first embodiment of the present invention.

FIG. 1 is a block diagram illustrating a configuration of a television broadcast program recording/playback system according to a first embodiment of the present invention. An antenna 10 receives a television broadcast wave (RF signal). A tuner/demodulator section 20 performs tuning and demodulation of the RF signal and outputs a transport stream (TS). TSs are sequentially recorded in a memory means 30 as necessary. The memory means 30 can be realized by a memory medium such as a memory card, an optical disk, a magnetic disk or the like, equipment including the memory medium, a wire or wireless network,—or the like. A TS decoder 40 analyzes a modulated TS or a TS read out from the memory means 30 and establishes a PES (Packetized Elementary Stream) for each of audio, video, subtitle and section information. Instead of recording a TS as it is in the memory means 30, audio and video PESs may be bitrate-converted and then recorded. An AV decoder 50 establishes audio and video data in a format which allows decoding and playback of the audio and video PESs at a predetermined timing.

A digest generation device 60A includes a character number calculation section 62, a digest scene specifying section 64 and a threshold setting section 66. The character number calculation section 62 extracts character codes displayed as subtitles from a subtitle PES output from the TS decoder 40 and calculates a display start time and a display end time. The character codes can be extracted from subtitle data stored in a data region of the subtitle PES. The display start time can be obtained from a PTS (Presentation Time Stamp) contained in a header region of the subtitle PES. The display end time can be calculated by obtaining a display timing of a screen delete code or the like contained in the subtitle data.

Figure 2:
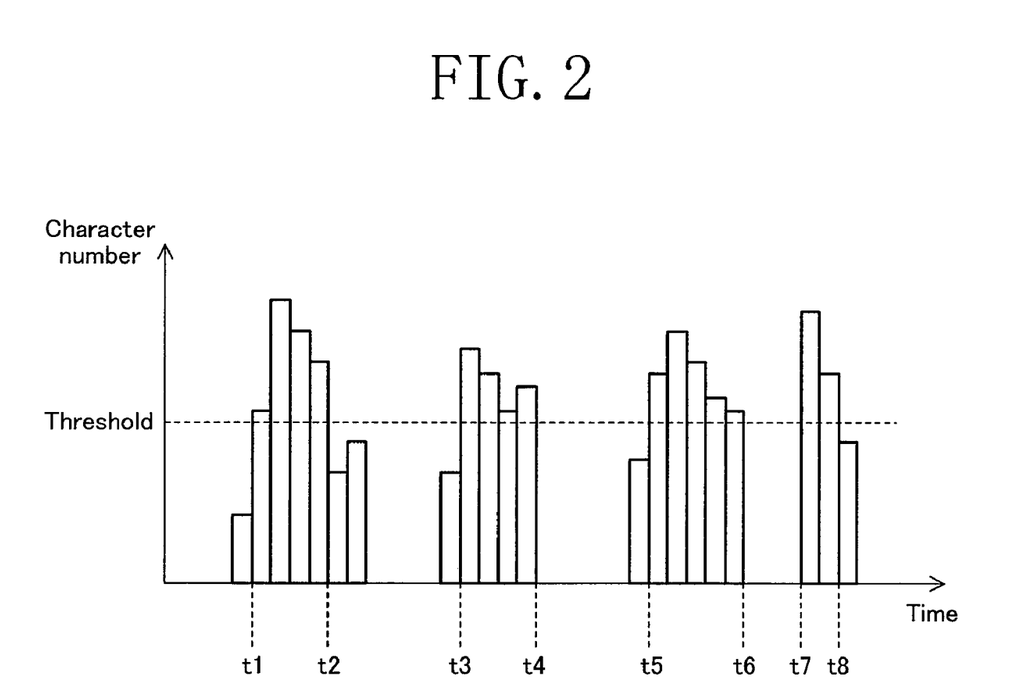
FIG. 2 is a graph showing an example of changes with time in character number calculated by a character number calculation section.

Next, after extracting character codes, the character number calculation section 62 calculates the character number of a subtitle displayed for each of segments provided at regular intervals. Calculated start and end times of each segment and calculated character number are recorded in the memory means 30 or some other buffer not shown in FIG. 2 as necessary. FIG. 2 is a graph showing an example of changes with time in character number calculated by the character number calculation section 62. Each segment has to have a length with which the character number to be displayed is moderately changed and thus is set to be longer than a display time of corresponding subtitles. Specifically, each segment may be set to be 20-30 seconds.

Figure 3:
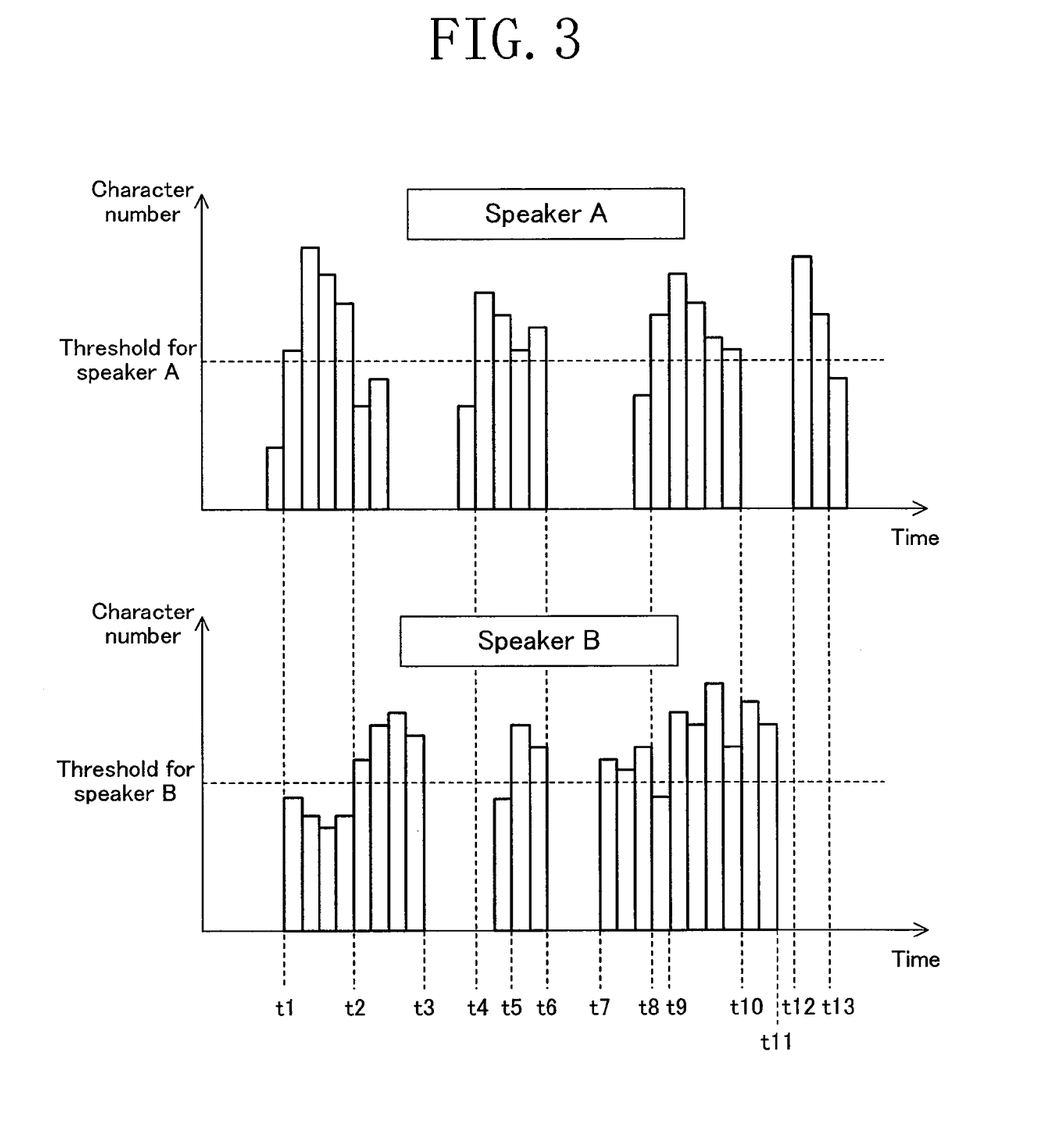
FIG. 3 shows graphs showing an example of changes with time in character number separately calculated for each speaker.

In some dramas and movies, subtitles are displayed such that utterances of each person distinguished from utterances of others by a different character color. Normally, such character color information is stored as a control code in the data region of the subtitle PES. Moreover, there are cases where at the beginning of subtitles, the name of a person who utters is displayed with parentheses as part of the subtitles. The character number calculation section 62 may analyze the data region to obtain character color information and parenthesized character information and use such information to distinguish a speaker and calculate the character number of each speaker. FIG. 3 shows graphs indicating an example of changes with time in character number separately calculated for each speaker. In this example, speakers A and B are identified and the character number of each of the speakers is calculated.

Returning to FIG. 1, for each segment of a television broadcast program, the digest scene specifying section 64 compares the character number calculated by the character number calculation section 62 with a threshold given by the threshold setting section 66 which will be described later. Then, a segment of which the calculated character number is larger than the threshold is specified as a digest scene of the television broadcast program to be processed. For example, in the example of FIG. 2, each of a segment from t1 to t2, a segment from t3 to t4, a segment from t5 to t6 and a segment from t7 to t8 is specified as a digest scene. A result of the specification is recorded in the memory means 30 or some other buffer not shown in FIG. 1 as necessary.

When the character number is calculated for each speaker by the character number calculation section 62, the digest scene specifying section 64 compares, for each speaker, the calculated character number with a threshold for the speaker given by the threshold setting section 66. Then, a segment in which the character number of any one of speakers is larger than the threshold for the speaker is specified as a digest scene of a television broadcast program to be processed. For example, in the example of FIG. 3, for the speaker A, the character number in each of a segment from t1 to t2, a segment form t4 to t6, a segment from t8 to t10 and a segment from t12 to t13 is larger than the threshold of the speaker A. On the other hand, for the speaker B, the character number in each of a segment from t2 to t3, a segment form t5 to t6, a segment from t7 to t8 and a segment from t9 to t11 is larger than the threshold of the speaker B. Therefore, each of a segment from t1 to t3, a segment from t4 to t6, a segment from t7 to t11 and a segment from t12 to t13 is specified as a digest scene.

Returning to FIG. 1, the threshold setting section 66 sums up respective times of the segments specified by the digest scene specifying section 64 and compares a sum of the times with a designated digest playback time. If the sum of the times is larger than the digest playback time, the threshold is set to be larger. When the threshold is changed, the digest scene specifying section 64 performs the processing of segment specification again using a new threshold after the change. As the threshold is increased, the number of segments of which the display character number is larger than the threshold is reduced. As a result, the sum of the times of the segments which fall in the above-described condition is reduced. Thus, a digest can fit in a designated time period. If necessary, the threshold setting section 66 may set the threshold to be smaller when the sum of the times of segments specified by the digest scene specifying section 64 is smaller than the digest playback time. Thus, a playback time of a digest to be generated can be increased.

When the character number is calculated for each speaker by the character number calculation section 62, the threshold setting section 66 may change respective thresholds of speakers independently or in conjunction with one another. For example, in the example of FIG. 3, only the threshold for the speaker A may be changed or the threshold for the speaker A may be increased or reduced and the threshold of the speaker B may be increased or reduced. As another option, the thresholds of the speakers A and B may be increased or reduced by the same value or at the same ratio.

A playback control section 70 controls readout of a TS from the memory means 30 and plays back audio and video data output from the AV decoder 50. In this control, the playback control section 70 performs control so that a TS corresponding to a segment specified by the digest scene specifying section 64 is read out. Thus, a digest of the television broadcast program is played back.

Playback of the digest may be performed after analyzing the entire television broadcast program which has been recorded, or may be performed while looking ahead subtitle information and specifying a segment by the digest scene specifying section 64. In the latter case, it is advantageous that only a small size buffer for temporarily storing a result of specification by the digest scene specifying section 64 is required.

As has been described, according to this embodiment, scenes of a television broadcast program each of which contains large character information by subtitles, i.e., scenes containing many conversations can be extracted throughout from the entire program. Thus, it is possible to generate an excellent digest for comprehension of a story plot of a broadcast program of drama, movie or like genre. Furthermore, by setting a threshold for each speaker, a digest in which each of persons has been weighted can be generated.

By operating the character number calculation section 62 and the digest scene specifying section 64 in parallel to recording of a television broadcast program, a digest can be generated while the television broadcast program is recorded in the memory means 30. In this case, the digest scene specifying section 64 records, in the memory means 30, a segment specified as a digest scene in association with a broadcast program being received. Thus, a digest can be immediately played back after recording of a television broadcast program. For a digest generated in the above-described manner, a playback time can not be adjusted and thus the threshold setting section 66 is not needed.

Moreover, without providing the threshold setting section 66, a threshold to be given to the digest scene specifying section 64 may be manually changed. Although a digest playback time is increased by setting the threshold to be smaller, a digest which contains a segment with a small display character number and allows easy comprehension of a story plot of the program is generated. On the other hand, by setting the threshold to be larger, a digest with a short playback time is generated. When a threshold is given for each speaker, each threshold may be manually changed.

Furthermore, symbols, external characters, parenthesized part, or the like contained in subtitles are not given for indicating a dialogue. Therefore, the character number calculation section 62 may be configured to calculate the character number so as to exclude characters other than characters describing a dialogue. Thus, a scene including utterance of each person can be extracted with high accuracy.

Second Embodiment

Figure 4:
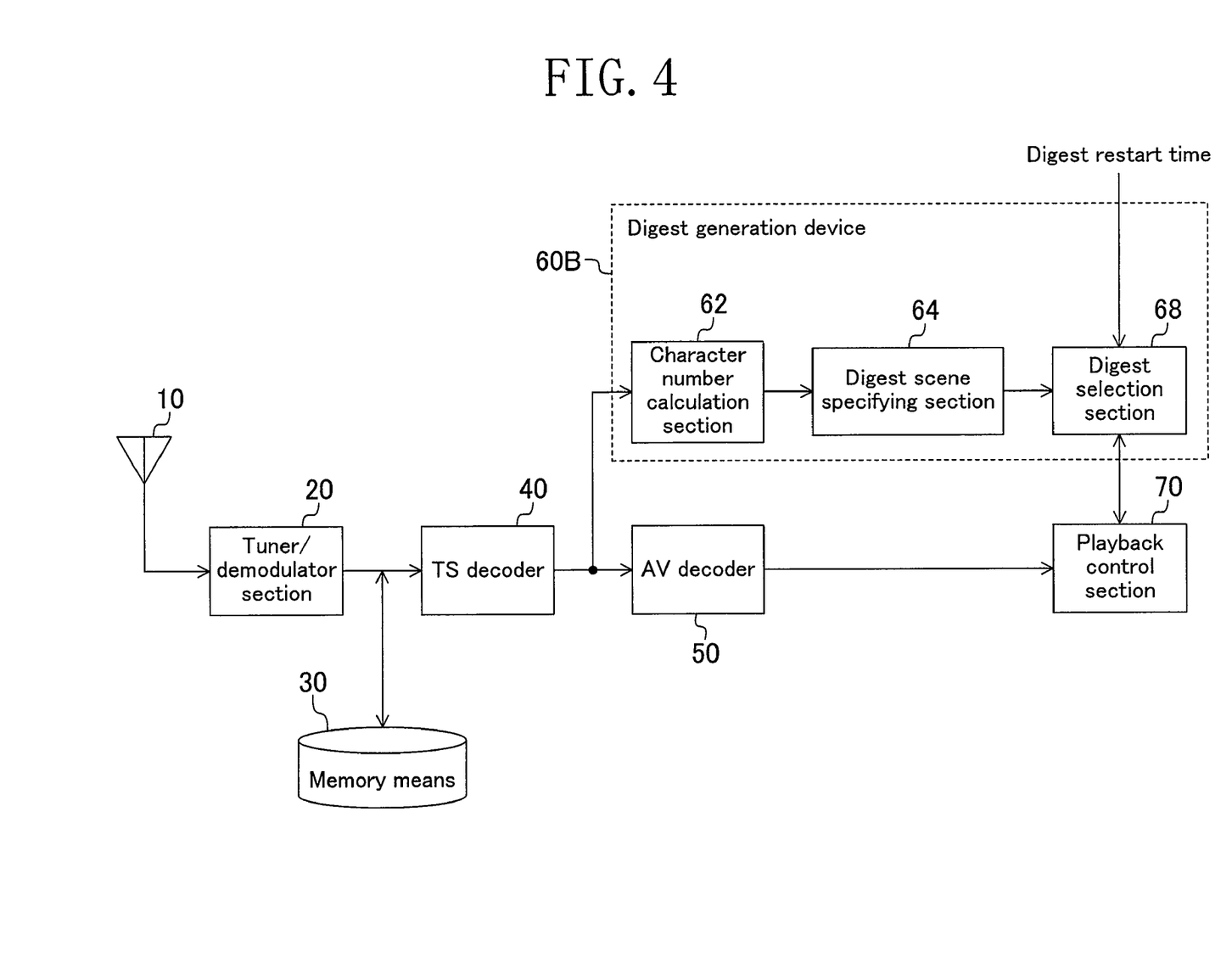
FIG. 4 is a block diagram illustrating a configuration of a television broadcast program recording/playback system according to a second embodiment of the present invention.

FIG. 4 is a block diagram illustrating a configuration of a television broadcast program recording/playback system according to a second embodiment of the present invention. The recording/playback system of this embodiment includes a digest generation device 60B, which is different from the digest generation device 60A in the recording/playback system of the first embodiment. Hereafter, only different points from the first embodiment will be described.

Figure 5:
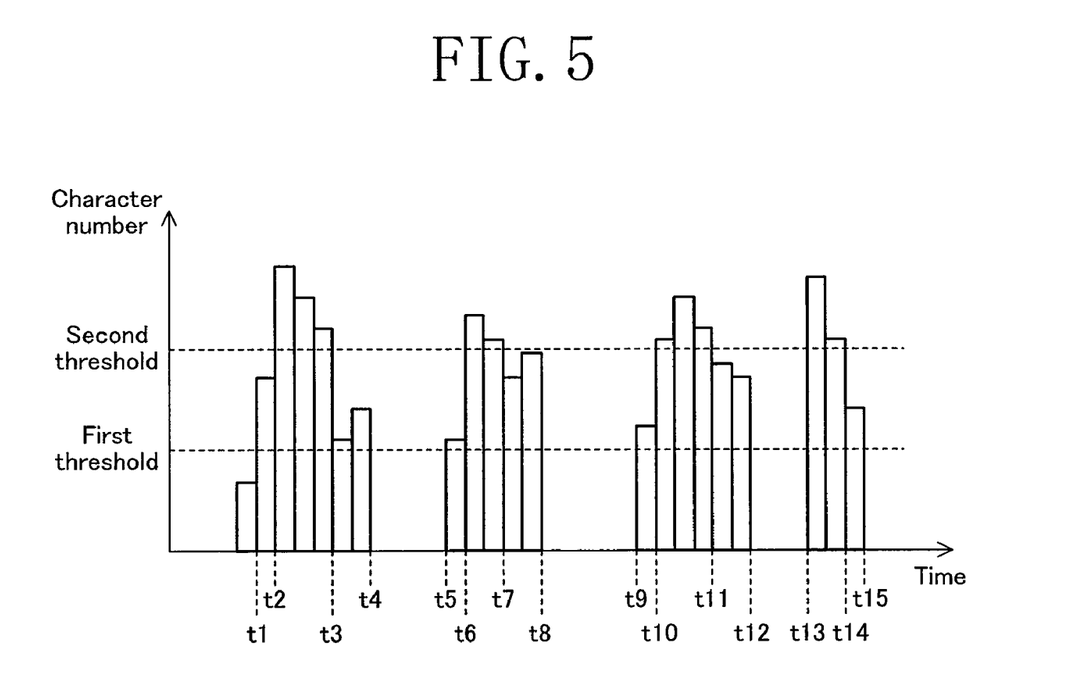
FIG. 5 is a graph showing an example of changes with time in character number calculated by a character number calculation section.

The digest scene specifying section 64 compares, for each segment of a television broadcast program, a character number calculated by the character number calculation section 62 with each of a plurality of thresholds. Then, the digest scene specifying section 64 specifies, for each of the thresholds, a segment in which the calculated character number is larger than an associated one of the thresholds as a digest scene of the television broadcast program to be processed. FIG. 5 is a graph showing changes with time in character number calculated by the character number calculation section 62. For example, the calculated character number is compared with two thresholds. In this embodiment, a second threshold is larger than a first threshold. In the example of FIG. 5, the calculated character number is larger than the first threshold in each of a segment from t1 to t4, a segment from t5 to t8, a segment from t9 to t12 and a segment from t13 to t15, and furthermore the calculated character number is larger than the second threshold in each of a segment from t2 to t3, a segment from t6 to t7, a segment from t10 to t11 and a segment from t13 to t14. A result of the specification is stored in the memory means 30 or some other buffer not shown in FIG. 4 as necessary.

Returning to FIG. 4, a digest selection section 68 sums up, for each of the thresholds, respective times of the segments specified by the digest scene specifying section 64 and compares a sum of the times with a designated digest playback time. Then, the digest selection section 68 selects, as a digest, one of groups of the specified segments for each of the thresholds in which the sum of the times is equal to or smaller than a digest playback time. For example, in an example of FIG. 5, if the digest playback time is large, a group of segments specified in comparison with the first threshold can be selected as a digest. On the other hand, if the digest playback time is small, a group of segments specified in comparison with the second threshold can be selected as a digest. The playback control section 70 controls playback of segments for a digest selected by the digest selection section 68.

As has been described, according to this embodiment, when a digest playback time is designated, a digest satisfying the designated time condition can be generated in a single processing without repeating the processing of digest scene specification by changing a threshold many times. Thus, processing speed of generating a digest can be improved.

Note that, for convenience, digest generation of a digital broadcast program has been described. However, a method for generating a digest according to the present invention is applicable to teletext broadcast.

Each of the character number calculation section 62, the digest scene specifying section 64, the threshold setting section 66 and the digest selection section 68 can be realized by making computer read a program recorded in a computer-readable recording medium or a program provided through an electronic communication line and then execute the program.

What is claimed is:

1. A device for generating a digest of a television broadcast program containing subtitle information, the device comprising:
   a character number calculation section configured to calculate, based on the subtitle information, a character number of a subtitle displayed in each of segments provided at regular intervals; and
   a digest scene specifying section configured to compare the calculated character number with a threshold and to specify, as one or more digest scenes of the television broadcast program, one or more segments in which the calculated character number is larger than the threshold, wherein:
   the character number calculation section calculates the character number in parallel to recording the television broadcast program, and
   the digest scene specifying section records information for the one or more specified segments in parallel to recording the television broadcast program.

2. A device for generating a digest of a television broadcast program containing subtitle information, the device comprising:
   a character number calculation section configured to calculate, based on the subtitle information, a character number of a subtitle displayed in each of segments provided at regular intervals;
   a digest scene specifying section configured to compare the calculated character number with a threshold and to specify, as one or more digest scenes of the television broadcast program, one or more segments in which the calculated character number is larger than the threshold; and
   a threshold setting section configured to sum up respective times of the one or more segments specified by the digest scene specifying section, to compare a sum of the times with a designated time and to change the threshold according to a comparison result,
   wherein the digest scene specifying section respecifies the one or more segments when the threshold is changed.

3. A device for generating a digest of a television broadcast program containing subtitle information, the device comprising:
   a character number calculation section configured to calculate, based on the subtitle information, a character number of a subtitle displayed in each of segments provided at regular intervals; and
   a digest scene specifying section configured to compare the calculated character number with a threshold and to specify, as one or more digest scenes of the television broadcast program, one or more segments in which the calculated character number is larger than the threshold, wherein:
   the character number calculation section identifies speakers based on the subtitle information and calculates the character number of each of the identified speakers, and
   for each of the identified speakers, the digest scene specifying section compares the calculated character number with a threshold of an associated one of the speakers and specifies, as one or more digest scenes of the television broadcast program, one or more segments in which a calculated character number of any one of the identified speakers is larger than the threshold of said any one of the speakers.

4. The device of claim 3, wherein the character number calculation section obtains information for a character color of the subtitle or character information attached to the subtitle from the subtitle information and identifies speakers using the information for the character color or the character information.

5. The device of claim 3, further comprising a threshold setting section configured to sum up respective times of the one or more segments specified by the digest scene specifying section, to compare a sum of the times with a designated time and to change the threshold according to a comparison result,
   wherein the digest scene specifying section respecifies the one or more segments when the threshold is changed.

6. A device for generating a digest of a television broadcast program containing subtitle information, the device comprising:
   a character number calculation section configured to calculate, based on the subtitle information, a character number of a subtitle displayed in each of segments provided at regular intervals, and
   a digest scene specifying section configured to compare the calculated character number with a threshold and to specify, as one or more digest scenes of the television broadcast program, one or more segments in which the calculated character number is larger than the threshold, wherein:
   the digest scene specifying section compares the calculated character number with each of a plurality of thresholds and specifying, for each of the thresholds, one or more segments in which the calculated number is larger than an associated one of the thresholds, and
   the device further comprises a digest selection section configured to sum up, for each of the thresholds, respective times of the one or more segments specified by the digest scene specifying section, to compare a sum of the times of each group of the segments specified for an associated one of the thresholds with a designated time and to select, as the digest of the television broadcast program, one of the groups of the specified segments in which the sum of the times is equal to or smaller than the designated time.

7. A device for generating a digest of a television broadcast program containing subtitle information, the device comprising:
   a character number calculation section configured to calculate, based on the subtitle information, a character number of a subtitle displayed in each of segments provided at regular intervals; and
   a digest scene specifying section configured to compare the calculated character number with a threshold and to specify, as one or more digest scenes of the television broadcast program, one or more segments in which the calculated character number is larger than the threshold,
   wherein the character number calculation section reads ahead the subtitle information and calculates the character number while the television broadcast program is read out from memory means.

8. A method for generating a digest of a television broadcast program containing subtitle information, the method comprising:
   a first step of calculating by using a computer, based on the subtitle information, a character number of a subtitle displayed in each of segments provided at regular intervals; and a second step of comparing the calculated character number with a threshold and specifying, as one or more digest scenes of the television broadcast program, one or more segments in which the calculated character number is larger than the threshold, wherein:

in the first step, the character number is calculated in parallel to recording of the television broadcast program, and in the second step, information for the one or more specified segments is recorded in parallel to recording of the television broadcast program.

9. A method for generating a digest of a television broadcast program containing subtitle information, the method comprising:

a first step of calculating by using a computer, based on the subtitle information, a character number of a subtitle displayed in each of segments provided at regular intervals;

a second step of comparing the calculated character number with a threshold and specifying, as one or more digest scenes of the television broadcast program, one or more segments in which the calculated character number is larger than the threshold; and a third step of summing up respective times of the one or more segments specified in the second step, comparing a sum of the times with a designated time and changing the threshold according to a comparison result, wherein in the second step, the one or more segments are respecified when the threshold is changed.

10. A method for generating a digest of a television broadcast program containing subtitle information, the method comprising:

a first step of calculating by using a computer, based on the subtitle information, a character number of a subtitle displayed in each of segments provided at regular intervals; and a second step of comparing the calculated character number with a threshold and specifying, as one or more digest scenes of the television broadcast program, one or more segments in which the calculated character number is larger than the threshold, wherein:

in the first step, speakers are identified based on the subtitle information and the character number is calculated for each of the identified speakers, and in the second step, for each of the identified speakers, the calculated character number is compared with a threshold of an associated one of the speakers and one or more segments in which a calculated character number of any one of the identified speakers is larger than the threshold of said any one of the speakers is specified as one or more digest scenes of the television broadcast program.

11. The method of claim 10, wherein in the first step, information for a character color of the subtitle or character information attached to the subtitle is obtained from the subtitle information and speakers are identified using the information for the character color or the character information.

12. The method of claim 10, further comprising a third step of summing up respective times of the one or more segments specified in the second step, comparing a sum of the times with a designated time and changing the threshold according to a comparison result, wherein in the second step, the one or more segments are respecified when the threshold is changed.

13. A method for generating a digest of a television broadcast program containing subtitle information, the method comprising:

a first step of calculating by using a computer, based on the subtitle information, a character number of a subtitle displayed in each of segments provided at regular intervals; and a second step of comparing the calculated character number with a threshold and specifying, as one or more digest scenes of the television broadcast program, one or more segments in which the calculated character number is larger than the threshold, wherein:

in the second step, the calculated character number is compared with each of a plurality of thresholds and one or more segments in which the calculated number is larger than an associated one of the thresholds are specified for each of the thresholds, and the method further includes a third step of summing up, for each of the thresholds, respective times of the one or more segments specified in the second step, comparing a sum of the times of each group of the segments specified for an associated one of the thresholds with a designated time and selecting, as the digest of the television broadcast program, one of the groups of the specified segments in which the sum of the times is equal to or smaller than the designated time.

14. A method for generating a digest of a television broadcast program containing subtitle information, the method comprising:

a first step of calculating by using a computer, based on the subtitle information, a character number of a subtitle displayed in each of segments provided at regular intervals; and a second step of comparing the calculated character number with a threshold and specifying, as one or more digest scenes of the television broadcast program, one or more segments in which the calculated character number is larger than the threshold, wherein in the first step, the subtitle information is read ahead and the character number is calculated while the television broadcast program is read out from memory means.

15. A non-transitory computer-readable recording medium in which a computer program for making computer generate a digest of a television broadcast program containing subtitle information is recorded, the computer program making computer function as:

character number calculation means for calculating, based on the subtitle information, a character number of a subtitle displayed in each of segments provided at regular intervals; and digest scene specifying means for comparing the calculated character number with a threshold and specifying, as one or more digest scenes of the television broadcast program, one or more segments in which the calculated character number is larger than the threshold, wherein:

the character number calculation means calculates the character number in parallel to recording of the television broadcast program, and the digest scene specifying means records information for the one or more specified segments in parallel to recording of the television broadcast program.

16. A non-transitory computer-readable recording medium in which a computer program for making computer generate a digest of a television broadcast program containing subtitle information is recorded, the computer program making computer function as:

character number calculation means for calculating, based on the subtitle information, a character number of a subtitle displayed in each of segments provided at regular intervals;

digest scene specifying means for comparing the calculated character number with a threshold and specifying, as one or more digest scenes of the television broadcast program, one or more segments in which the calculated character number is larger than the threshold; and threshold setting means for summing up respective times of the one or more segments specified by the digest scene specifying means, comparing a sum of the times with a designated time and changing the threshold according to a comparison result is further recorded, wherein the digest scene specifying means respecifies the one or more segments when the threshold is changed.

17. A non-transitory computer-readable recording medium in which a computer program for making computer generate a digest of a television broadcast program containing subtitle information is recorded, the computer program making computer function as:

character number calculation means for calculating, based on the subtitle information, a character number of a subtitle displayed in each of segments provided at regular intervals; and digest scene specifying means for comparing the calculated character number with a threshold and specifying, as one or more digest scenes of the television broadcast program, one or more segments in which the calculated character number is larger than the threshold, wherein:

the character number calculation means identifies speakers based on the subtitle information and calculates the character number of each of the identified speakers, and for each of the identified speakers, the digest scene specifying means compares the calculated character number with a threshold of an associated one of the speakers and specifies, as one or more digest scenes of the television broadcast program, one or more segments in which a calculated character number of any one of the identified speakers is larger than the threshold of said any one of the speakers.

18. The non-transitory recording medium of claim 17, wherein the character number calculation means obtains information for a character color of the subtitle or character information attached to the subtitle from the subtitle information and identifies speakers using the information for the character color of the subtitle or the character information.

19. The non-transitory recording medium of claim 17, wherein the computer program further makes computer function as threshold setting means for summing up respective times of the one or more segments specified by the digest scene specifying means, comparing a sum of the times with a designated time and changing the threshold according to a comparison result is further recorded, wherein the digest scene specifying means respecifies the one or more segments when the threshold is changed.

20. A non-transitory computer-readable recording medium in which a computer program for making computer generate a digest of a television broadcast program containing subtitle information is recorded, the computer program making computer function as:

character number calculation means for calculating, based on the subtitle information, a character number of a subtitle displayed in each of segments provided at regular intervals; and digest scene specifying means for comparing the calculated character number with a threshold and specifying, as one or more digest scenes of the television broadcast program, one or more segments in which the calculated character number is larger than the threshold, wherein:

the digest scene specifying means compares the calculated character number with each of a plurality of thresholds and specifying, for each of the thresholds, one or more segments in which the calculated number is larger than an associated one of the thresholds, and the computer program further makes computer function as digest selection means for summing up, for each of the thresholds, respective times of the one or more segments specified by the digest scene specifying means, comparing a sum of the times of each group of the segments specified for an associated one of the thresholds with a designated time and selecting, as the digest of the television broadcast program, one of the groups of the specified segments in which the sum of the times is equal to or smaller than the designated time is further recorded.

21. A non-transitory computer-readable recording medium in which a computer program for making computer generate a digest of a television broadcast program containing subtitle information is recorded, the computer program making computer function as:

character number calculation means for calculating, based on the subtitle information, a character number of a subtitle displayed in each of segments provided at regular intervals; and digest scene specifying means for comparing the calculated character number with a threshold and specifying, as one or more digest scenes of the television broadcast program, one or more segments in which the calculated character number is larger than the threshold, wherein the character number calculation means reads ahead the subtitle information and calculates the character number while the television broadcast program is read out from memory means.

\* \* \* \* \*